Figure 1:
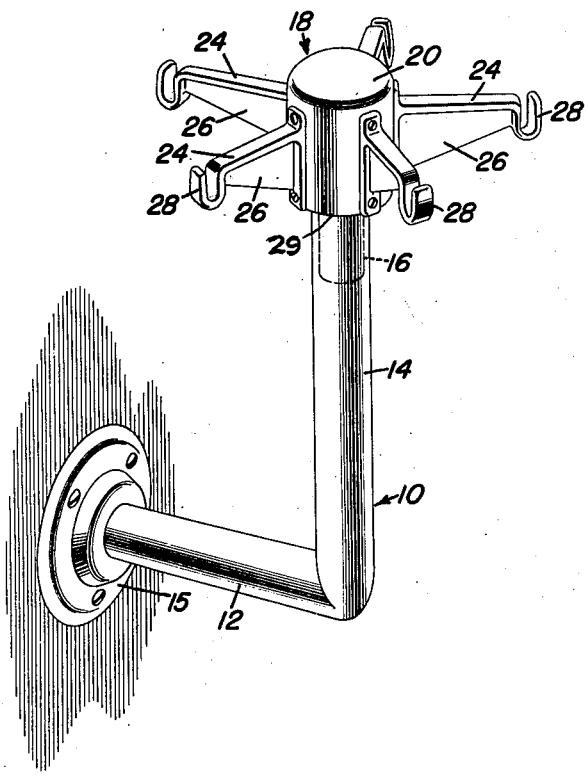

May 26, 1953  W. A. LEE  2,639,820
BARBER'S CLIPPERS STAND
Filed Nov. 17, 1950

Wilson A. Lee
INVENTOR.

Patented May 26, 1953

2,639,820

UNITED STATES PATENT OFFICE 2,639,820

BARBER'S CLIPPERS STAND

Wilson A. Lee, Amarillo, Tex.

Application November 17, 1950, Serial No. 196,215

1 Claim. (Cl. 211—163)

This invention relates to improvements in a means of holding barbers' equipment.

An object of this invention is to provide an improved hanger or holder for barber's clippers, said hanger or holder being mounted on a support which has a tube with an upwardly opening bore to accommodate a shank rotatively, said shank forming a part of a head having arms to support the clippers.

Ancillary objects and features of importance will become apparent in following the description of the illustrated forms of the invention.

Figure 2:
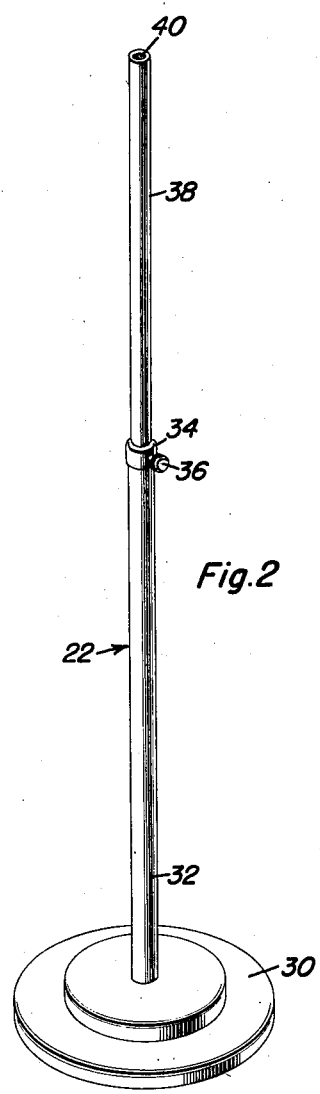

In the drawings:

Figure 1 is a perspective view of the device showing it attached to a mounting bracket; and Figure 2 is a perspective view of a stand which may be used in lieu of the mounting bracket.

As noted in Figure 1, there is a mounting bracket 10 which is substantially L-shaped having a horizontal leg 12 and a vertical leg 14. The horizontal leg is provided with a flange 15 which is adapted to be fixed to any suitable stationary object.

The vertical leg 14 is in the form of a tube having an upwardly opening bore 40 to accommodate the shank 16, said shank constituting a part of a head or cap 18. This head has a disc or head member 20 of larger diameter than the shank 16, to which it is attached, the lower surface of the head member 20 forming a bearing in its contact with the upper edge of the tube 14. As will be noted from the drawings, the head member 20 is in the shape of an inverted cup including a disc and an integral, downwardly depending peripheral flange 29.

The head 18 is rotatably mounted on the tube 14 for facility in use by the barber or beautician. The same head may be connected with the stand 22 in a manner to be described subsequently.

A plurality of arms 24, reinforced by the webbing 26, is attached to the head member 20 and the arms are arranged in radial disposition with respect to the head member.

Each arm is provided with an upwardly opening substantially U-shaped hook 28 which is adapted to removably support a barber's implement, for example, a pair of clippers.

Attention is now invited to Figure 2. The stand 22 may be used in lieu of the mounting bracket 10. The stand consists of a base 30 having a vertical sleeve 32 connected thereto and rising therefrom. There is a collar 34 secured to the uper end of the sleeve 22 in order to accommodate the set screw 36.

The set screw engages the tube 38 which has an upwardly opening bore 40 therein. The bore is adapted to accommodate the shank 16 just as the bore in the tube 14 accommodates this shank.

By using the support 22 the vertical movement of the tube 38 may be put to use in holding the head 18 in selected vertical positions.

Having described the invention, what is claimed as new is:

A device for holding barber's clippers, said device comprising a support including a vertically rising tube having an open upper end, a cap closing the upper end of said tube, said cap comprising a disc having an integrally depending peripheral flange concentrically surrounding the upper end of said tube, a rod secured to and depending from the center of said disc and being rotatably mounted in the open upper end of said tube, radially extending arms secured to the outer surface of said peripheral flange and being spaced circumferentially therearound, and upwardly opening hooks formed at the outer ends of said arms, said arms constituting hangers for barber's clippers.

WILSON A. LEE.

References Cited in the file of this patent

UNITED STATES PATENTS

| Number | Name | Date |
|---|---|---|
| 446,362 | Newman | Feb. 10, 1891 |
| 769,188 | Shannon | Sept. 6, 1904 |
| 928,659 | Hunt | July 20, 1909 |
| 1,065,381 | Martin | June 24, 1913 |
| 1,194,813 | Brown | Aug. 15, 1916 |
| 1,524,300 | Gottlieb | Jan. 27, 1925 |
| 1,623,196 | Neahr | Apr. 5, 1927 |
| 1,762,185 | Mendle | June 10, 1930 |
| 2,033,430 | Kirik | Mar. 10, 1936 |